Figure 1:
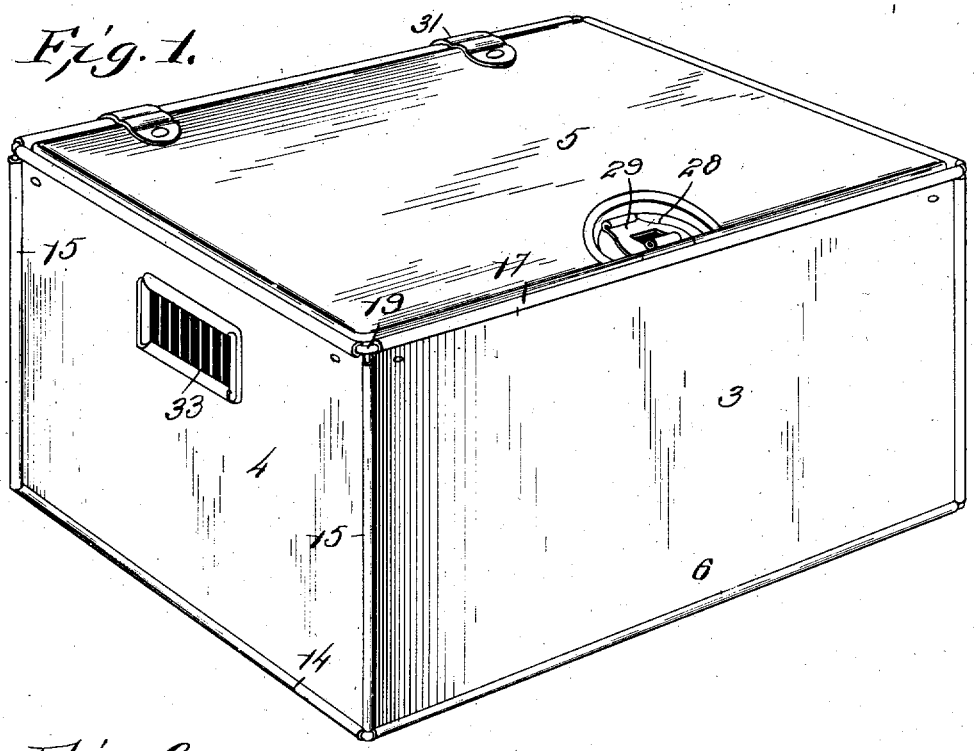

No. 12,775. REISSUED APR. 7, 1908.

G. KLENK.

METAL BOX.

APPLICATION FILED OCT. 16, 1907.

3 SHEETS—SHEET 1.

Witnesses

L. L. Armstrong

N. E. Costello.

Inventor

G. Klenk

By

H. H. Bliss

Attorney

No. 12,775. REISSUED APR. 7, 1908.

G. KLENK.

METAL BOX.

APPLICATION FILED OCT. 16, 1907.

3 SHEETS—SHEET 2.

Witnesses
C. L. Armstrong.
N. E. Costello.

Inventor
G. Klenk
By H. H. Bliss
Attorney

No. 12,775. REISSUED APR. 7, 1908.

G. KLENK.

METAL BOX.

APPLICATION FILED OCT. 16, 1907.

3 SHEETS—SHEET 3.

Witnesses

L. L. Armstrong.

N. E. Costello.

Inventor

G. Klenk

By

H. H. Bliss.

Attorney

UNITED STATES PATENT OFFICE.

GOTTLIEB KLENK, OF DEFIANCE, OHIO, ASSIGNOR TO THE CLIPPER PLOW COMPANY, OF DEFIANCE, OHIO, A CORPORATION OF OHIO.

METAL BOX.

No. 12,775. Specification of Reissued Letters Patent. Reissued Apr. 7, 1908.

Original No. 813,976, dated February 27, 1906, Serial No. 255,425. Application for reissue filed October 16, 1907. Serial No. 397,761.

*To all whom it may concern:*

Be it known that I, GOTTLIEB KLENK, a citizen of the United States, residing at Defiance, in the county of Defiance and State of Ohio, have invented new and useful Improvements in Metal Boxes, of which the following is a specification.

This invention relates to improvements in metal beer-boxes of the type set forth in the patent granted to G. Klenk and J. F. Fink on the 24th day of December, 1904, No. 778,680.

The object of the present invention is to provid. specific structures to strengthen the box and to arrange the parts to economize in the manufacture of the same.

In the patent referred to the projection at the bottom of the box was formed by the sections distanced from the sides to form what was termed a "seat." In actual practice in the manufacture of the article it has been found necessary to form a reinforcing element at the corners and to introduce a separate piece to form the projection. By inserting the separate piece the corner is strengthened and a rigid and more substantial projection is produced.

It has developed that the corner-braces may be more expeditiously made and attached, and to this end a simpler and more economical brace is provided in the present invention.

The cover as shown in the prior patent was formed by rolling the metal around a strengthening element and forming a raised bead at the edges. In packing the boxes this raised bead was found to be objectionable, and it formed a place for water to settle; furthermore, the corners were cut off at an angle which formed an opening and permitted water which settled in the depression of the cover to run down inside the box. To overcome these difficulties, the edges are turned over at the top and then around the reinforcing element to provide a smooth upper surface, and the corners are cut in the form of an arc and bent in such manner as to permit the ready and convenient bending of the same, and yet cover the uppermost edge of the reinforcing element to prevent water running between the same and the bead.

The prime object of the invention is to arrange the sections in such manner that a strong, substantially braced, and neat metal box with a cover flush with the edges of the sides is provided.

Other objects and advantages will be hereinafter referred to and be particularly pointed out in the claims.

Figure 2:
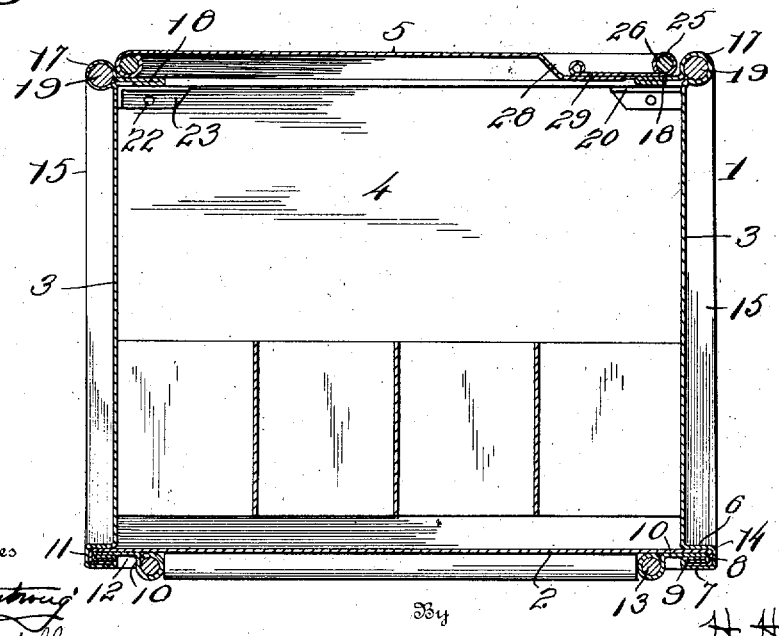
Figure 3:
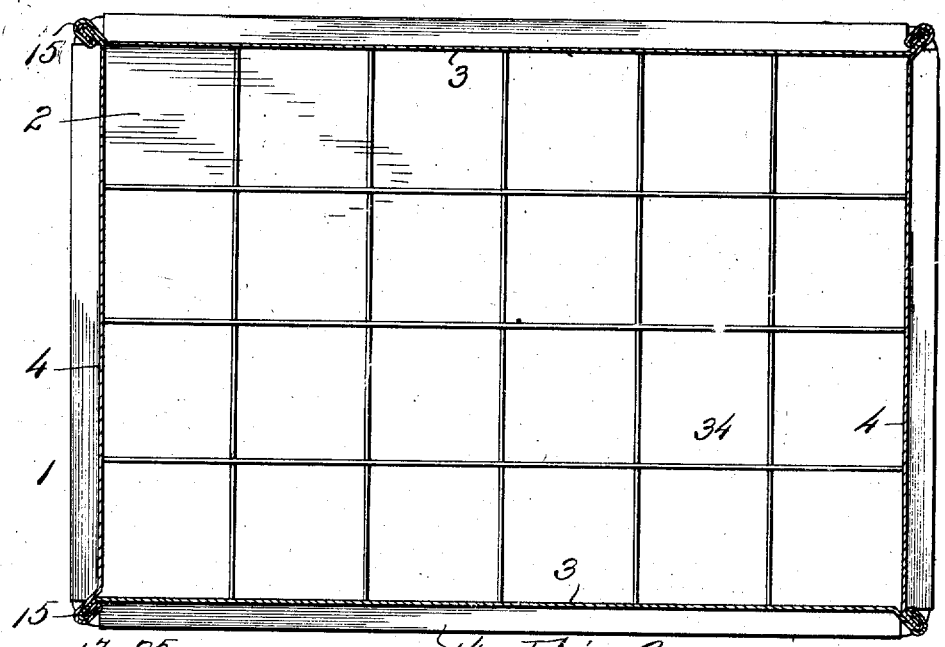
Figure 4:
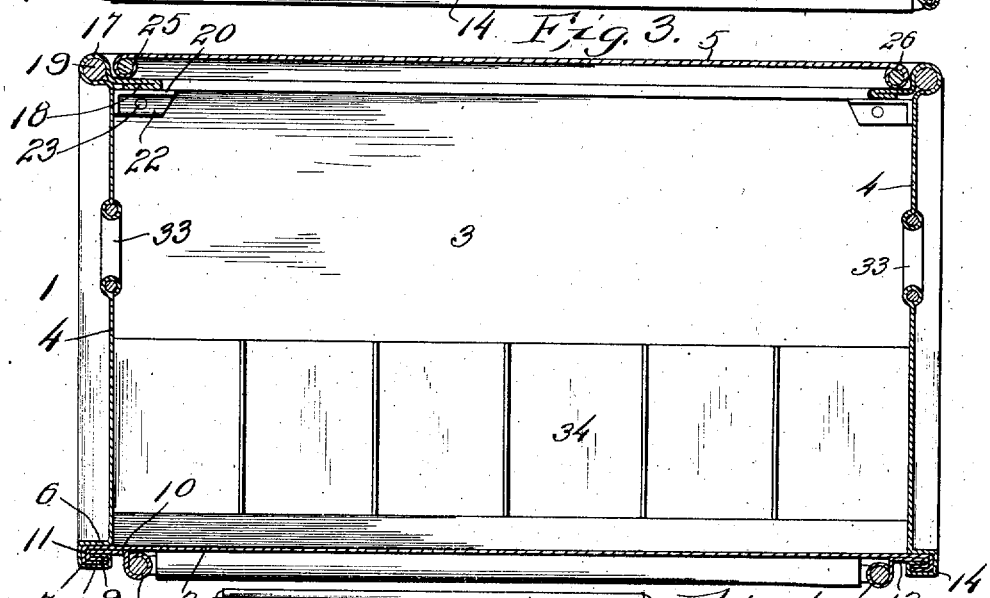
Figure 9:
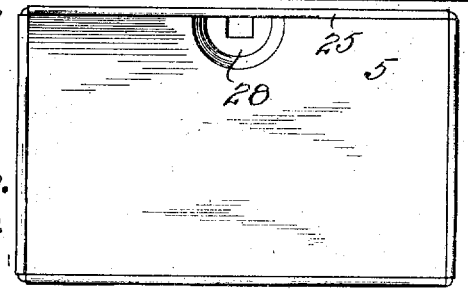
Figure 6:
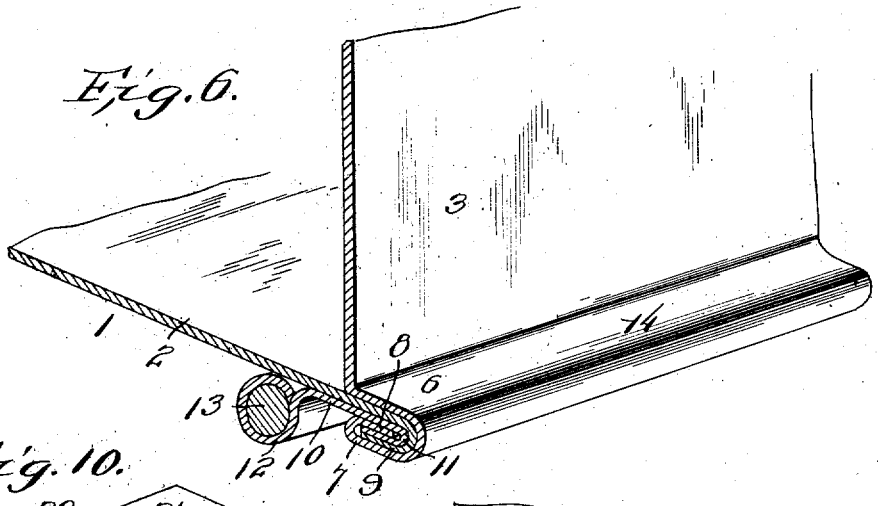
Figure 10:
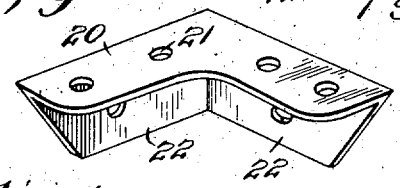
Figure 8:
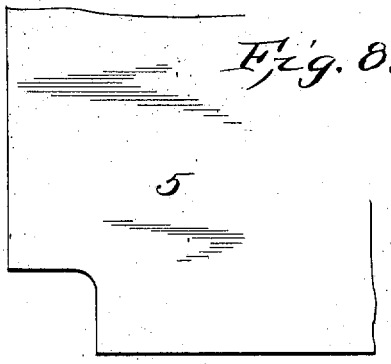
Figure 7:
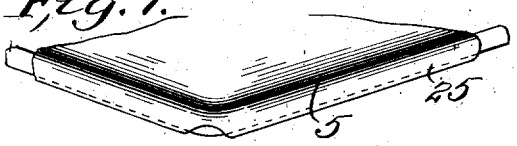
Figure 5:
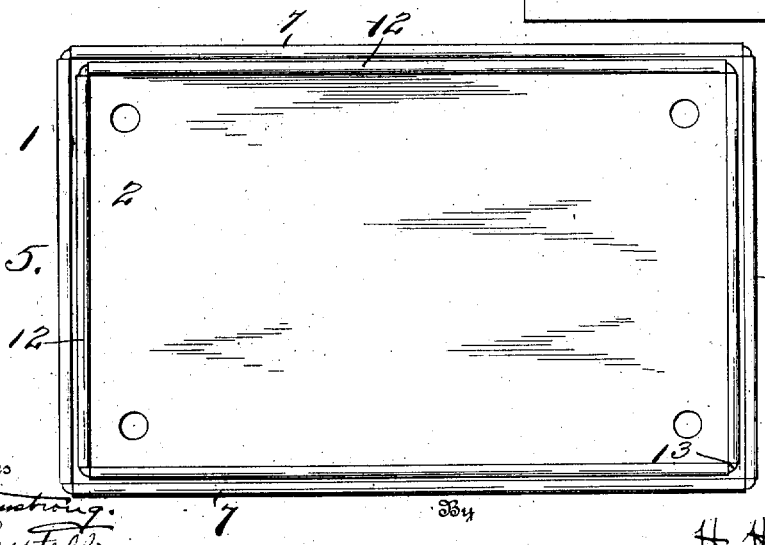

In the drawings,—Figure 1 is a perspective view of the improved box. Fig. 2 is a transverse section of the same. Fig. 3 is a horizontal section. Fig. 4 is a vertical section. Fig. 5 is a bottom plan view. Fig. 6 is an enlarged detail perspective view of the lower edge of the box. Fig. 7 is a detail view of the corner of the cover. Fig. 8 is a detail view of the corner of the cover before it is bent around the reinforcing element. Fig. 9 is a bottom plan view of the cover. Fig. 10 is a detail view of a corner-brace.

1 indicates a metal box comprising a bottom 2, sides 3, 3, ends 4, 4, and cover 5, formed of sheet metal.

The side and end sections 3 3 and 4 4 are bent outwardly at the lower corners, as shown at 6, then inwardly, as at 7, and out again, as at 8. The bottom is bent at its outer edges to conform to the shape of the space formed by the bends 6, 7 and 8, as shown at 9. The edges of reinforcing-strips 10 are interposed between the bends of the sides and bottom, as shown at 11, said reinforcing-strips 10 extending inwardly a short distance from the edges of the box to form a seat 12, adjacent which a bead is formed to receive a rod 13, to provide a substantial projection at the bottom of the box. The bending or crimping of the ends of the metal as described produces a strong reinforcing outwardly-projecting corner 14 to prevent the box being dented or battered in handling.

The bar 13 is made of a continuous piece bent at the corners, and the reinforcing-strips abut against the corners, as clearly shown in the bottom plan view.

The corners of the sections engage each other and are crimped to produce outwardly-extending beads 15, which are in a plane with the bottom outwardly-projecting corners 14. These beads reinforce the corners of the box and at the same time prevent denting and battering, which mars and frequently distorts the structure and renders it impossible to force a bottle in the cell adjacent the corners.

The upper part of the ends and sides are beaded, as at 17, the beads extending outwardly from the plane of the sections flush with the projections 14 and 15. The metal is extended inwardly from the bottom of the beads 17 and then bent on itself to form a depressed reinforced flange 18 to receive the cover. A bar 19 is inclosed by the beads 17 to reinforce the structure, as will be readily understood.

The corners of the flange 18 are mitered and connected together by corner-braces 20, riveted at 21, and provided with downwardly extending flanges 22, riveted to the sides and ends at 23. The braces 20 and the reinforced flange 18 make a substantial support for the cover to resist the strain when the boxes are piled upon each other.

The cover 5 is made of sheet metal and is flush at the top with the upper edge of the beads 17, the outer edges being beaded, as at 25, and inclosing a rod 26. The beads 17 are bent in from the bottom and the corners of the cover are cut out in the arc of a circle, so that when the beads are formed the corners of the rod are covered, as shown in Fig. 7. This detail of construction serves to prevent water trickling between the beads and the rod. The cover is formed with a depression 28, surrounded by a bead to reinforce it, and in the depression a lock 29 is located. The cover is hinged at 31 to the rod 19.

33 indicates hand-holes formed in the end sections, and 34 cells of ordinary construction.

A box constructed as described is neat and durable, the parts being so arranged to resist the strain incident to the rough handling and wear when in use, the reinforcing-flanges and beads being located at the points which ordinarily receive the roughest wear.

What I claim as new is—

1. A metal box comprising ends, sides and bottom sections, means for fastening the ends and sides together, reinforcing-strips at the outer edges of the bottom, the reinforcing strips and the ends and sides of the box being crimped to form an outwardly-extending flange at the lower edges of the box, said strips extending inwardly against bottom of the box and beaded to form a projection horizontally spaced from the said flange.

2. A metal box comprising ends, sides and bottom sections, means for fastening the ends and sides together, a reinforcing outwardly-projecting flange at the lower edges of the box, and a projection next to and extending from the bottom of the box said projection being spaced horizontally from the outwardly-projecting flange.

3. A metal box comprising sides, ends and bottom sections, the sides and ends being crimped at the meeting edges to form outwardly-projecting flanges, a reinforcing-strip on the bottom, the sides, ends and bottom being crimped around the outer edge of the reinforcing-strip to form an outwardly-projecting flange at the lower edge of the box, and a depending projection on the inner edge of said reinforcing-strip, said projection being spaced from the outwardly-projecting flange formed at the lower edge of the box.

4. A metal box comprising side, end, and bottom sections, a reinforcing-strip at the outer edges of the bottom, said strip being parallel with and fitting against the under side of the bottom, the edges of the sides, ends, and bottom being crimped around the edge of the reinforcing-strip to form a reinforcing outwardly-projecting flange, the inner edge of the reinforcing-strip being bent to form a projecting head which is spaced from the outer edge of the reinforced flange.

5. A metal box formed with a depressed flange near its upper edge, a metal cover supported by the depressed flange, said cover being reinforced by beading its edges around a strengthening-wire located on the under side of the cover to form a flat surface on top of the cover.

6. A metal box formed with a depressed flange near its upper edge, a metal cover supported by the depressed flange, said cover being reinforced by beading its edges around a strengthening-wire located on the under side of the cover to form a flat surface on top of the cover, a depression formed adjacent one edge of the cover, and a lock, the upper end of which is flush with the top of the cover, and operating in the depression.

7. A metal box formed of sections of sheet metal, some of the sections being shaped to provide a depressed horizontal flange extending inwardly from the upper portion of each of the side and end walls of the box at points below the upper edges of same, and means for rigidly securing the said flanges together at the corners of the box, substantially as set forth.

8. A metal box formed of sections of sheet metal, some of the sections being shaped to provide a depressed horizontal flange extending inwardly from each of the side and end walls of the box at points below the upper edges of same, and clips each of which rigidly secures two of the said flanges together at the corners of the box, substantially as set forth.

9. A metal box formed of sections of sheet metal, some of the sections being shaped to provide a depressed horizontal flange extending inwardly from the upper portion of each of the side and end walls of the box at points below the upper edges of same, and clips each of which rigidly secures two of the said flanges together at the corners of the box and is itself secured to the adjacent end and side walls of the box, substantially as set forth.

10. In a metal box formed of sections of sheet metal, horizontal flanges extending inwardly from the upper portion of the sides and ends, and clips each of which is rigidly secured to the underside of two of said flanges at the corners of the box and to the adjacent end and side walls at a point below said flanges, substantially as set forth.

11. In a metal box formed of sections of sheet metal, side and end sections and the reinforcing section 10 crimped with the side and end sections to form the flanges 14 and bent to form the projecting bead 12 horizontally spaced from the flange 14, substantially as set forth.

12. In a metal box, side and end sections, a horizontal article supporting element a reinforcing section 10 said reinforcing-section being crimped with the side and end sections to form the flanges 14 and bent to form the projecting bead 12 horizontally spaced from the flange 14, and reinforcing wire 13 within said bead, substantially as set forth.

13. In a metal box formed of sections of sheet metal, side, end and bottom sections and the reinforcing section 10 crimped with the side, end and bottom sections to form the flange 14 and bent to form the projecting bead 12 horizontally spaced from the flange 14, substantially as set forth.

14. A sheet metal box having the upper edges of the side and end walls reinforced and being provided with a depressed flange below said reinforcement which extends inward from the upper portions of each of the side and end walls of the box, and with means for rigidly securing the flanges together at the corners of the box whereby the flanges are made in one continuous rectangular reinforcement, all the parts of which are immovable relative to each other.

15. In a sheet metal box, the combination with side and end walls formed to provide an inward projecting depressed flange, of a reinforcing wire above said flange around which the upper edges of said side and end walls are bent, and clips for rigidly securing together said inward projecting flanges whereby the flanges are made into one continuous rectangular reinforcement all the parts of which are immovable relative to each other.

In testimony whereof I affix my signature in presence of two subscribing witnesses.

GOTTLIEB KLENK.

Witnesses:
HENRY B. HARRIS,
JULIUS J. BLAIR.